April 28, 1942. G. H. DOWTY 2,281,351
AIRCRAFT LANDING GEAR
Filed Nov. 25, 1939 7 Sheets-Sheet 1

Inventor,
George Herbert Dowty
By,
Taulumi & Taulumi
Attnys

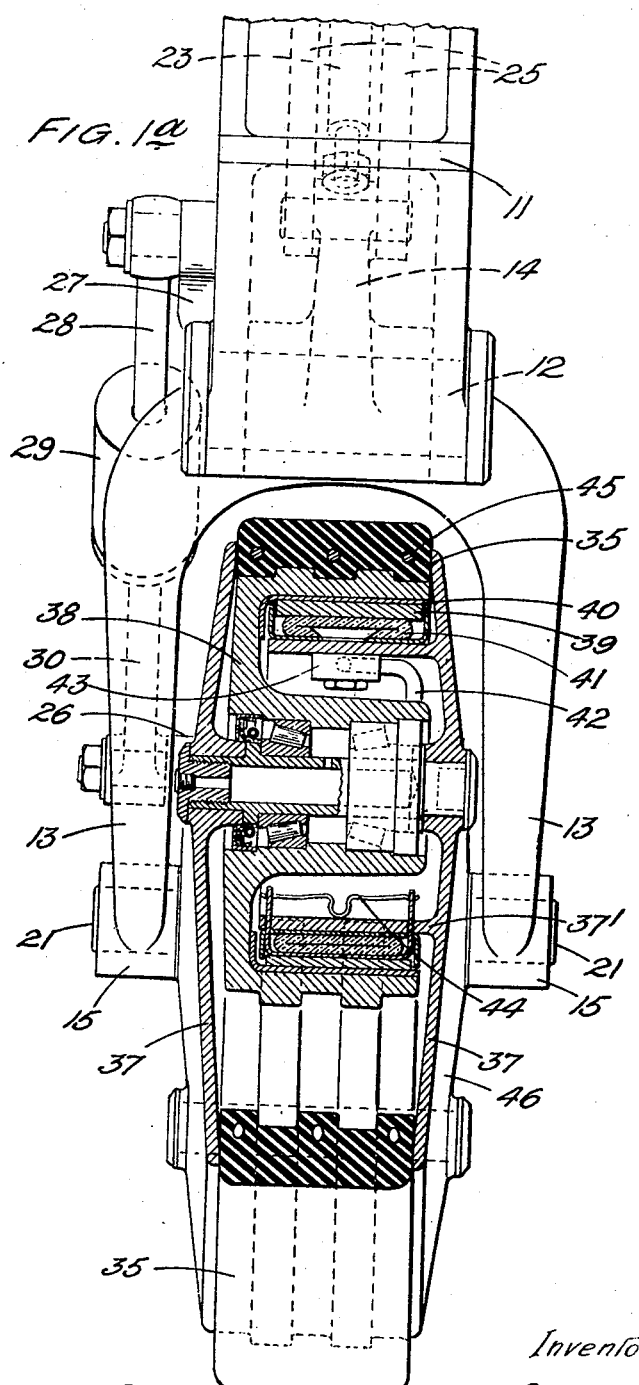

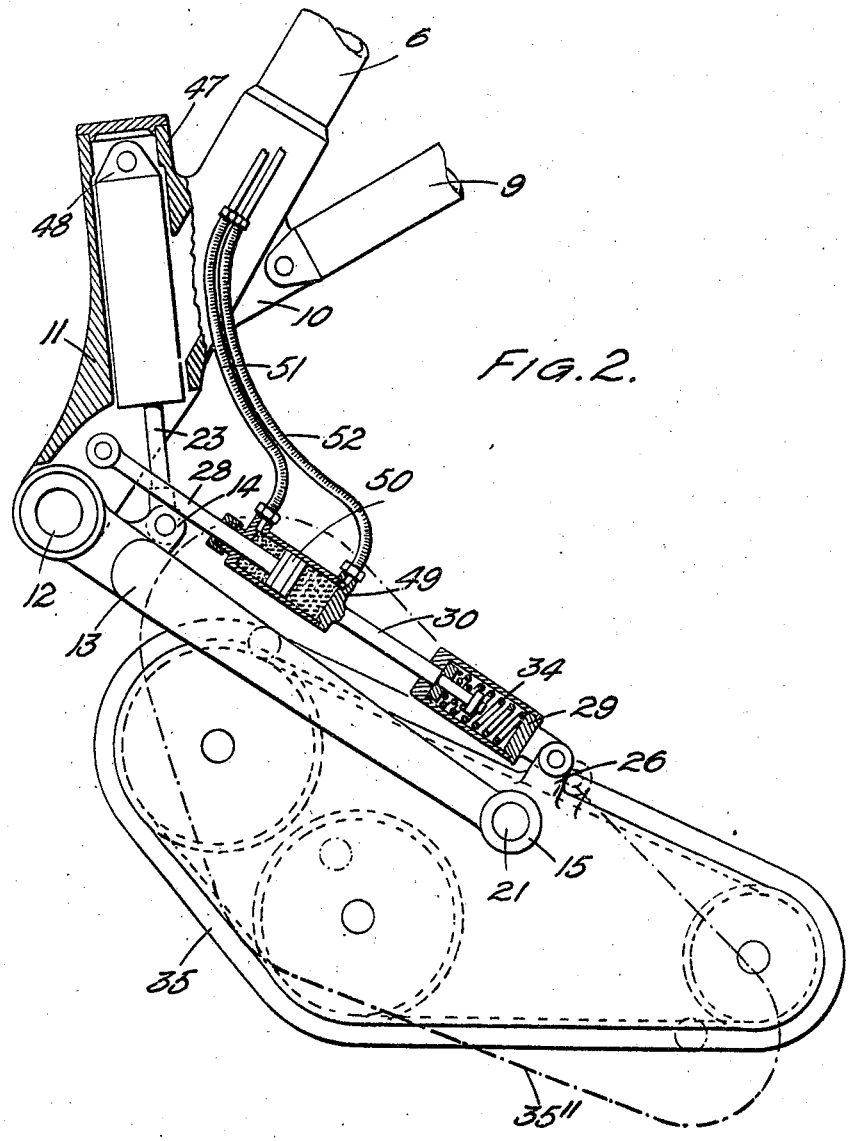

April 28, 1942.  G. H. DOWTY  2,281,351
AIRCRAFT LANDING GEAR
Filed Nov. 25, 1939　　7 Sheets-Sheet 5
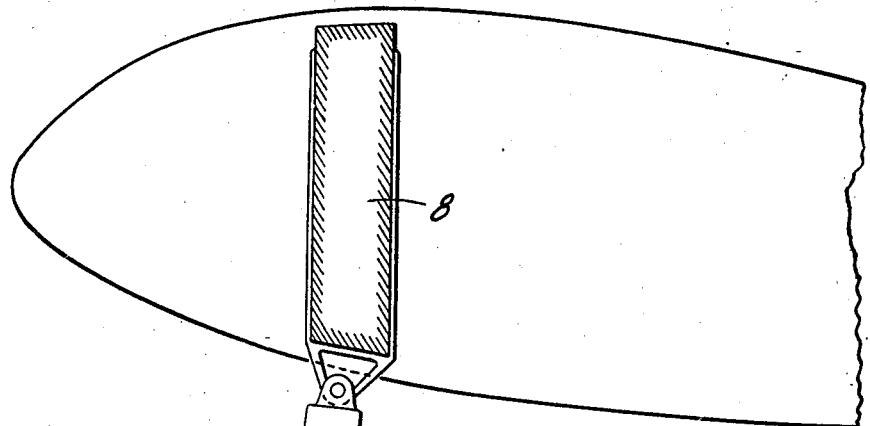
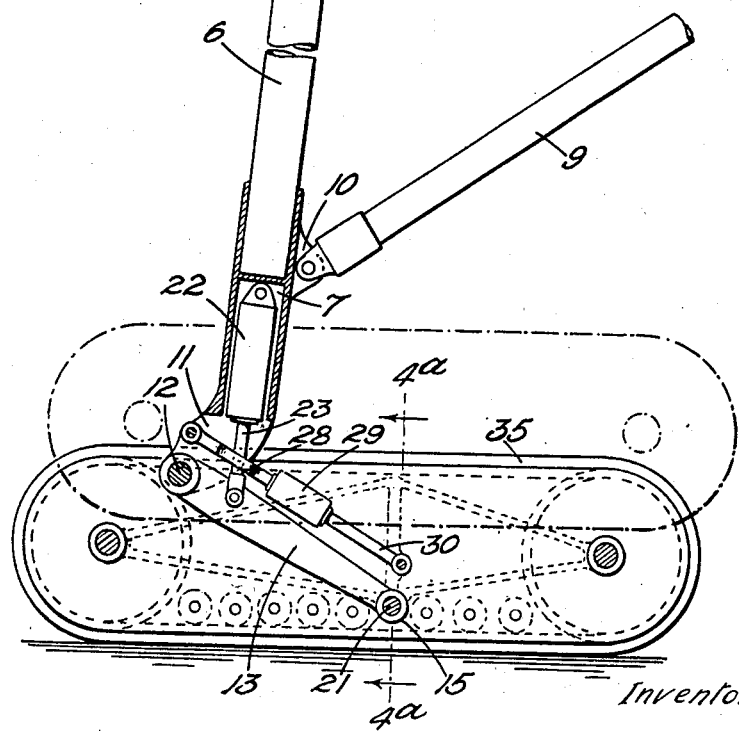
FIG.4.
Inventor,
George Herbert Dowty
By Jaubmin & Jaubmin
Attys.

April 28, 1942.     G. H. DOWTY     2,281,351
AIRCRAFT LANDING GEAR
Filed Nov. 25, 1939     7 Sheets-Sheet 6
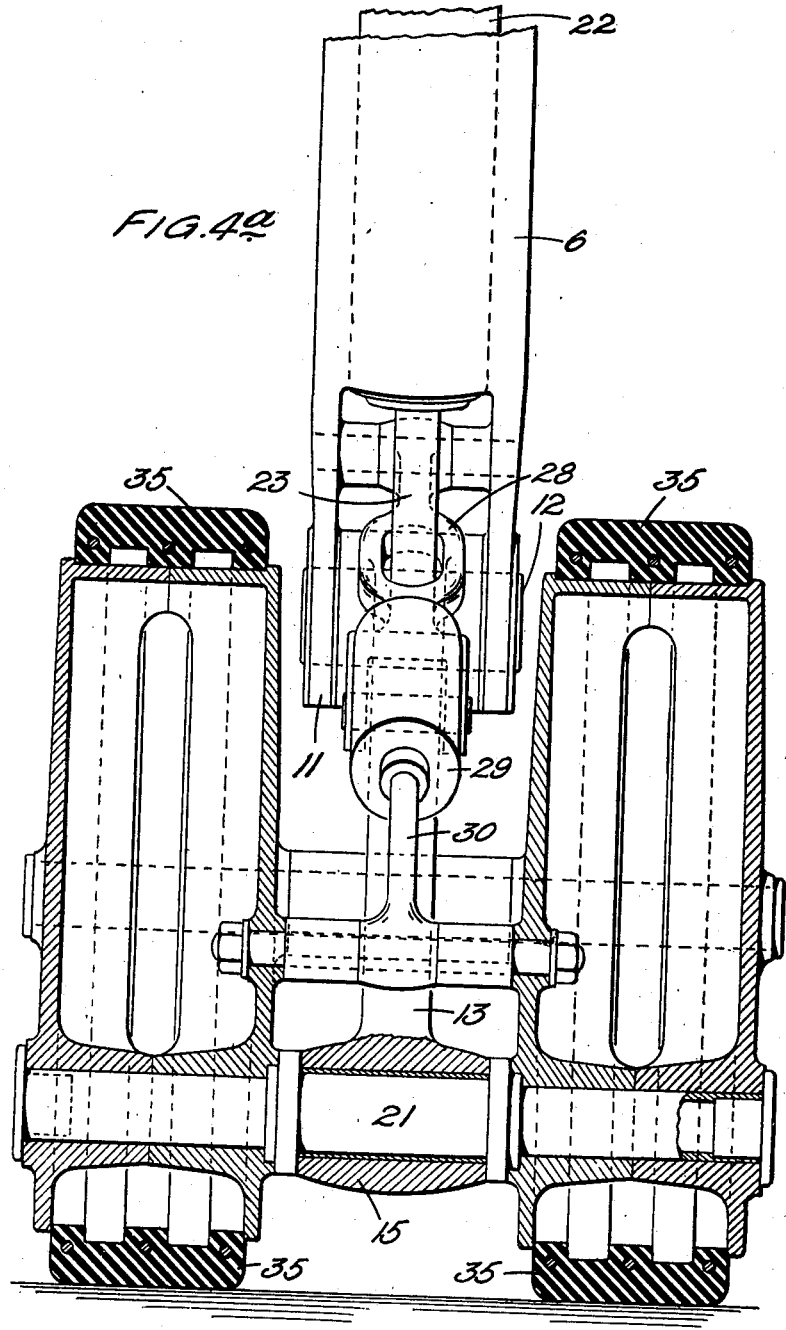
FIG.4ª
Inventor,
George Herbert Dowty
By
Taulmin & Taulmin
Attny.s

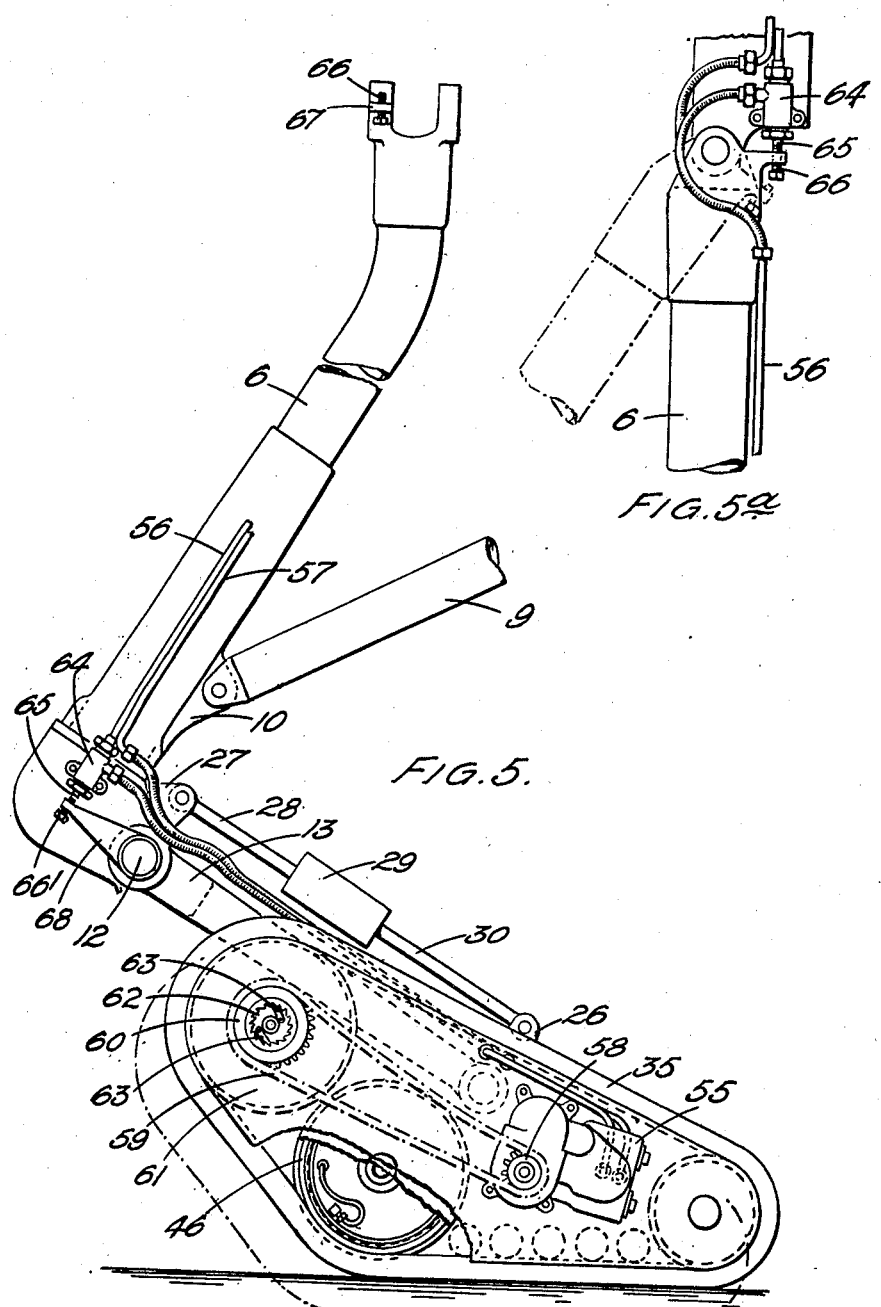

Patented Apr. 28, 1942

2,281,351

UNITED STATES PATENT OFFICE 2,281,351

AIRCRAFT LANDING GEAR

George Herbert Dowty, Cheltenham, England

Application November 25, 1939, Serial No. 306,205
In Great Britain December 8, 1938

23 Claims. (Cl. 244—100)

My invention relates to aircraft landing gear. It is concerned with the provision of a satisfactory arrangement of aircraft landing gear employing caterpillar tracks.

What is perhaps the fundamental reason for employing caterpillar tracks is that they give a large ground contact area for comparatively small dimensions; that is in fact the basic reason for their employment in agricultural and military land vehicles and it will be appreciated that even if that inherent advantage were the only point in favour, the successful embodiment of caterpillar tracks in aircraft landing gear would be a highly meritorious proposition.

On brief consideration of aircraft employing ordinary wheeled landing gear—particularly in the case of very large aircraft—there are several disadvantages. Firstly, in order to obtain sufficient ground contact area to support a large aircraft large diameter wheels have to be used. Next, it will be appreciated that large wheels and tyres are apt to be excessively heavy. In addition it is conceivable that the housing in a retracted condition of an undercarriage of such a large quantity of air as is contained within the tyres in a state of compression may constitute a serious danger, particularly on military aircraft where the tyres are likely to be punctured by gun-fire. In any event large wheels take up a very considerable space when retracted, which space might well be put to better use. Again, if a large tyre should become deflated the very nature of the landing gear is at once completely altered and serious consequences may arise on landing or even if a burst occurs during taxi-ing.

My invention has for an object to overcome the disadvantages above referred to, and to provide aircraft landing gear employing a caterpillar track or a plurality of such tracks in which the landing gear as a whole possesses shock-absorbing and resilient qualities commensurate with those provided by normal aircraft landing gear employing pneumatic tyres.

Another object of my invention is to do away with the necessity for employing any kind of pneumatic track thereby at once overcoming all the disadvantages pertaining thereto, such for instance as the possibility of structural damage due to a tyre bursting in a stowed condition or bursting on landing.

Having in mind the advantages of caterpillar tracks as compared with the disadvantages of ordinary wheels when employed in aircraft landing gear, the present invention has for a primary object the provision of a practicable method of mounting caterpillar tracks on aircraft and consists in the provision in an aircraft of a caterpillar landing element, a supporting structure therefor extending from the aircraft, lever means connecting said caterpillar element to said supporting structure, and resilient means tending to restrain movement of such landing element in a vertical sense under load. The invention includes the provision of a particularly advantageous arrangement in which comparatively large movement of the caterpillar element under load is accompanied by relatively small shock-absorber deflection. Also further the invention may provide for rearward travel of the landing element under load.

In the accompanying drawings forming a part of this specification and in which like numerals are employed to designate like parts throughout the same:

Figure 1a is a section on the line 1a—1a of Figure 1;

Figure 2 is a fragmentary side elevation mainly in section illustrating a modified form of my invention;

Figure 3:
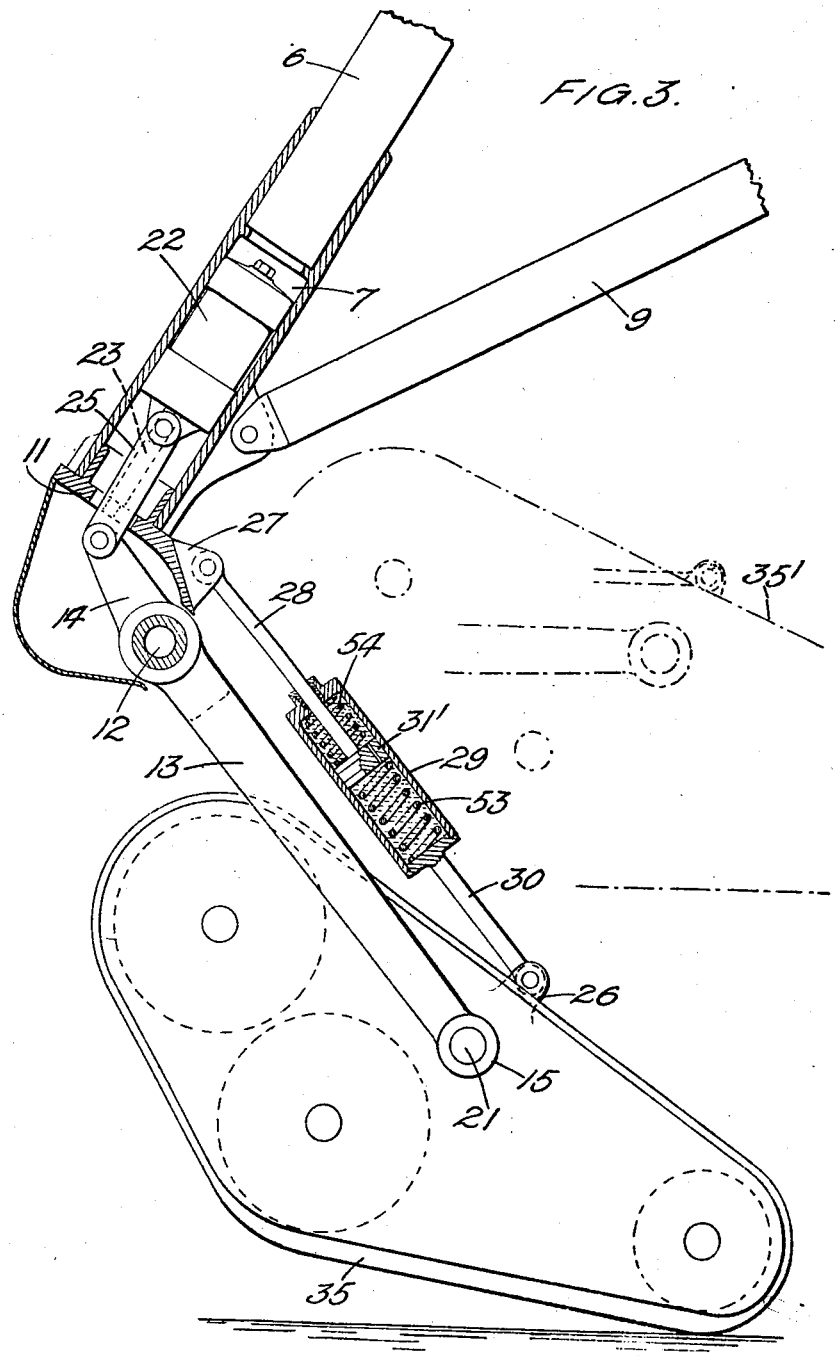

Figure 3 more or less corresponds to Figure 2 and illustrates a further modified form of my invention;

Figure 4 is a side elevation partly in section illustrating an undercarriage leg employing a further modified arrangement according to my invention;

Figure 4a is a section on the line 4a—4a of Figure 4;

Figure 5 is a side elevation of an element of landing gear according to my invention embodying means for driving the caterpillar track; and Figure 5a is a fragmentary view of a valve arrangement for appropriately connecting and disconnecting the driving means to a hydraulic motor on retraction and extension of the landing gear.

It may be mentioned that the present specification deals with the application of my invention to landing gear generally, whether such landing gear is retractable or not. The arrangement shown in Figure 5 is applied to landing gear retracting in a sideways sense, but it is to be understood that the arrangement is equally applicable to landing gear retracting by movement in a fore and aft or perhaps in some other sense.

Figure 1:
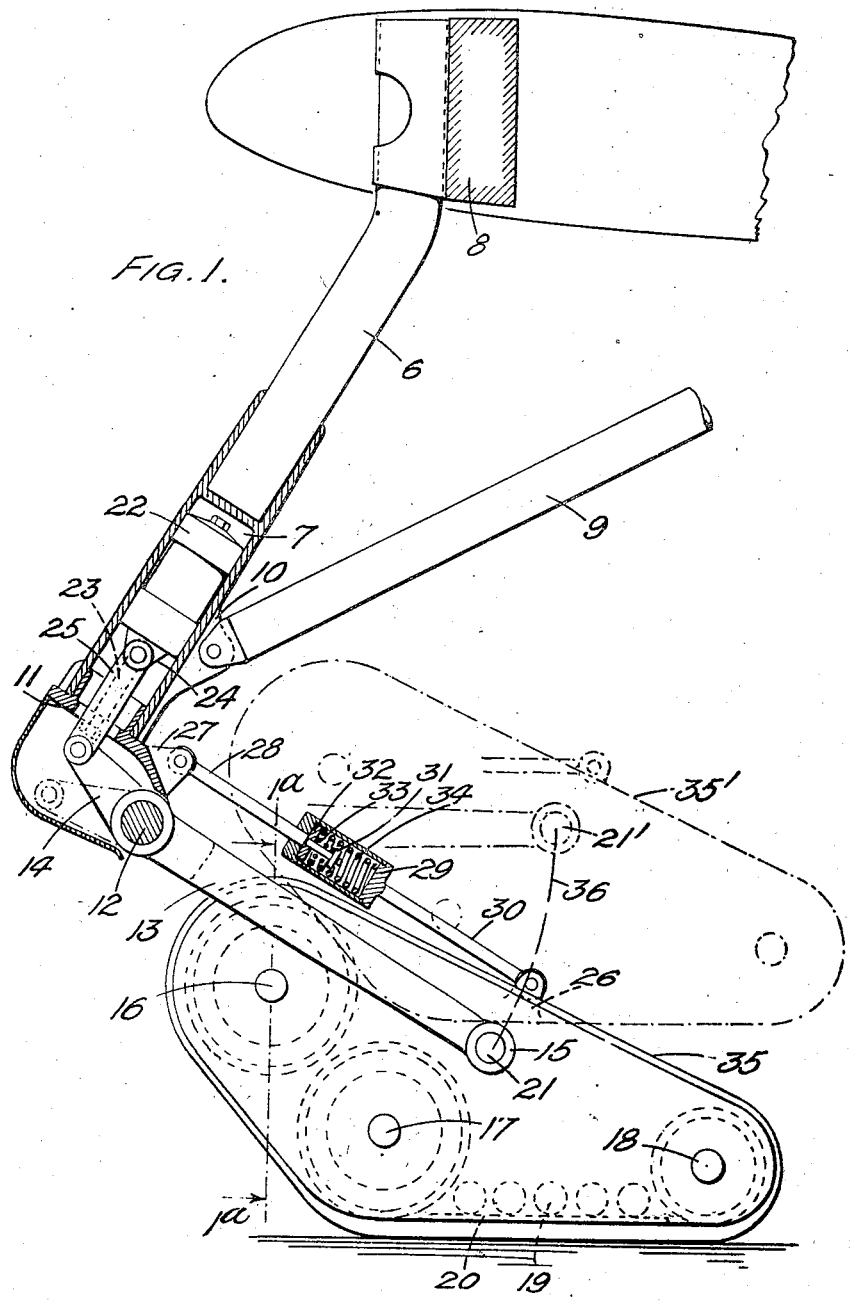
Figure 1 is a side elevation mainly in section of an undercarriage leg according to my present invention.

Dealing now with Figures 1 and 1a, there is represented at 6 an undercarriage leg, generally of tubular form but at any rate formed hollow at its lower end providing thereat a chamber as indicated at 7. The upper end of the leg is secured in any convenient manner to a fixed part of the aircraft structure, as indicated by the reference numeral 8, and in order to brace the leg assembly adequately a strut 9 extends from any convenient fixed point of the aircraft to a lug 10 provided near the lower extremity of the leg. At its extreme lower end the leg structure 6 is provided with a fitting, indicated generally by the reference numeral 11. The fitting 11 provides an anchorage for the main pivot 12 about which a lever may swing. The lever extends downwardly in an unloaded condition of the aircraft and is in trail. Moreover, the downwardly and rearwardly extending arm 13 is very considerably longer than the short arm 14 which extends in a direction substantially opposite to the arm 13. The outer extremity of the lever arm 13 terminates in a pivot lug 15 pivotally mounting a caterpillar landing element.

The caterpillar landing element is constituted by a rigid box frame structure having side walls between which there extend the main wheel axles 16, 17 and 18, while additional rollers as indicated at 19 may be located in the caterpillar structure so as to lie along the bottom or supporting run 20. In the present case the long lever arm 13 is forked and embraces the caterpillar unit, being located for instance by the pivot pins 21 which engage the lugs 15 of the forked lever arm 13 whereby the caterpillar unit is free to pivot in the pitching sense to a limited degree in relation to the lever arm 13.

In the chamber 7 of the leg 6 there is provided any convenient form of telescopic shock-absorber unit as indicated at 22. As shown, the shock-absorber includes a plunger of which the rod 23 is visible. The rod is secured to the fitting 11 and consequently remains stationary during shock-absorbing movements during which the cylinder constitutes the movable element of the shock-absorber means. The cylinder has at its lower end lug portions 24 conveniently extending down laterally at each side of the piston, and to those lug portions 24 links 25 are pivoted to establish connection between the cylinder and the short lever arm 14. The fitting 11 is of course appropriately slotted to allow the levers 25 to pass through as will be seen for instance by reference to Figure 3.

In addition to the movements which must take place for shock-absorption purposes, the caterpillar unit should also be able to yield in pitch—that is to say to change its attitude relative to the aircraft by rocking about the axis 21 by which it it attached to the forked long lever arm 13. In order to permit a limited variation in pitch and at the same time ensure that the attitude of the landing element is suitable for landing, a pivot bearing 26 is provided at a convenient point of the caterpillar unit, that point being so positioned that when a yieldable link is inserted to extend between the lug 26 and a lug 27 conveniently provided upon the fitting 11, the yieldable link provides with the long lever arm 13 a parallelogram of which the side comprised by the yieldable link is of variable length under resilient restraint. In consequence, therefore, the requisite variation in pitch of the caterpillar unit such as may occur on landing or when obstacles are encountered may be accommodated. The yieldable link comprises a plunger rod 28 arranged to slide within a cylinder 29 provided on the rod 30. The plunger rod 28 carries a fixed head 31 between which and a slidable head 32 there is located a spring 33 under compression. Likewise, a compression spring 34 extends between the inner face of the sliding head 32 and the opposite end of the cylinder 29.

The caterpillar landing element includes an endless track 35 preferably formed of smooth rubber adequately vulcanised and reinforced by the insertion of strengthening wires as shown in greater detail in Figure 1a and described below.

It is to be understood that the lever connection 13 between the caterpillar unit and the leg 6 or equivalent supporting structure is of paramount importance because, affording as it does a considerable movement of the caterpillar element in relation to the comparatively small deflection of the shock-absorber, there is provided a landing gear with a caterpillar landing element which gear is able to offer resilience akin to that which would be expected from a low pressure pneumatic tyre. It should further be observed that such a lever form of suspension provides not only for the requisite displacement of the caterpillar element in a vertical sense, but also affords a degree of movement in a fore an aft direction. This movement in the fore and aft sense can be observed by reference to the arc 36 indicating the swing of the lever arm 13 about the pivot 12. The chain line position of the caterpillar unit indicated at 35' together with the corresponding position 21' of the pivot 21 shows a loaded condition of the landing gear. It is believed that the yield in a fore and aft sense is of considerable importance providing as it does movement corresponding to the yield of a pneumatic tyre on striking an obstruction.

By reference to Figure 1a the construction of the forked lever arm 13 is apparent and the side walls 37 of the caterpillar element are also clearly shown. In addition Figure 1a shows the leading wheel 38 of the caterpillar unit in section revealing the internal brake gear. The shoe of the brake is of known internal expanding kind in which the friction blocks 39 are moved into braking contact with a drum 40, carried internally of the wheel 38, by means of a tube 41 expandable by fluid pressure through the pipe line 42 and connection 43. Brake pull off springs 44 engage apertures in lugs which extend through the brake shoe anchorage 37', the springs cooperating with the inner surfaces of the anchorage 37' to draw the blocks inwardly. The strengthening wires 45 in the endless track 35 are also clearly shown in Figure 1a as well as the leading lower wheel 46.

Referring now to Figure 2, it may be stated that the general lay-out is substantially the same as that of Figure 1 but there are essential differences. In this case the lever connecting the lower end of the leg or equivalent supporting structure 6 to the caterpillar unit comprises an arm 13 turning about the main pivot 12, whilst the equivalent of the short arm is provided by the length of arm 13 between the pivot 12 and a lug conveniently designated 14. To this lug 14 is pivotally attached the shock-absorber plunger rod 23. As shown, the cylinder of the shock-absorber is mounted in a housing 47, and in this case it is the cylinder which is fixed, being connected by a pin extending through the end lug 48 so that for shock-absorbing purposes, the plunger rod moves in the cylinder.

The main purpose of Figure 2 is to illustrate an arrangement for controlling the pitch of a caterpillar element and to achieve that object a double acting jack is provided in the yieldable link previously described. The rod 30 extending from the caterpillar unit in this case includes a spring unit the cylinder of which is again represented by 29 attached directly to the caterpillar unit. The rod 28 is pivotally attached to the leg structure and carries a piston 50 which is double acting within a hydraulic cylinder 49. The piston 50 is moved appropriately as pressure is applied through one or other of the pipelines 51, 52.

It will be appreciated that by extension of the jack on application of pressure through the pipeline 52 the yieldable link extends, with the result that the tail of the caterpillar unit is depressed into the position indicated at 35". The primary purpose of this arrangement is to enable the pilot to control the attitude of the landing element at will for example to suit landing and take off conditions, the double acting jack being for the purpose controllable by suitable means in the cockpit.

The arrangement shown in Figure 3 is a modification of the Figure 1 arrangement, the caterpillar element is biassed to a tail-down position without any special operating means being necessary. According to this arrangement, the cylinder 29 in the yieldable link is the body of an oleo pneumatic shock-absorber of which the cylinder is connected to the caterpillar unit by the rod 30, while the plunger 28 is connected to the lug 27. This shock-absorber is spring assisted in actuation and the plunger 31', which of course is apertured to allow liquid to pass through under shock-absorbing loads, has at one side a relatively strong compression spring 53, whereas on the other side of it there is the relatively weaker compression spring 54. The result of that arrangement is that in a no-load condition the spring 53 overcomes the weaker spring 54 and therefore tends to bias the caterpillar unit to the tail-down condition in which it is illustrated. In this case the yieldable link becomes of particular significance because as the landing gear structure takes the initial landing load as the aircraft alights, the first action is for the caterpillar element to turn about the pivot 21 which it can do by compressing the spring 54, and in yielding in contact with the ground it is ensured that the track is thus speeded up so that when the aircraft becomes fully supported by the caterpillar unit its track is already moving at a speed at least approximating to that required.

Referring now to Figures 4 and 4a, the caterpillar element comprises a rigid frame structure on which a pair of laterally spaced tracks 35 are supported, being borne by front and rear main wheels with intermediate rollers to support the bearing surface of the track. By this arrangement it is possible to ensure that the lever 13 by which the caterpillar element is attached to the leg 6 can be housed between the tracks as shown. Further, by reason of the fact that the lever 13 does not have to embrace the caterpillar element it is possible to keep the lever 13 comparatively short. Again, in this case it is the plunger 23 of the shock-absorber unit which moves in shock-absorption action and therefore the outer end of the plunger rod 23 is connected to the lever 13 at a point near the main pivot 12. The same consideration of providing for orientation of the caterpillar element in pitch prevails as in the examples previously described and is likewise dealt with by the yieldable link comprising the rods 28 and 30 and spring device indicated at 29.

The arrangement shown in Figure 5 corresponds to the embodiment described in Figure 1, although in the case of Figure 5 certain details concerned with retraction being described and partially illustrated. The main purpose of Figure 5 is to illustrate a driving arrangement by means of which the track 35 can be speeded up on extension of the landing gear so as to have a velocity approximately the same as that which it will require when travelling in contact with the ground. For driving, the caterpillar unit includes a small hydraulic motor, indicated generally by the reference numeral 55, capable of being driven from an available source of fluid pressure communicated to the motor under the required conditions of extension through the pipelines 56, 57. The driving shaft of the motor 55 has fast upon it a sprocket 58 connected by the driving chain 59 to the driven sprocket 60 associated with a driven wheel 61 of the caterpillar unit. The hub of the sprocket includes a free-wheel device of which the ratchet and pawl members have been respectively indicated by the reference numerals 62 and 63. It is the intention in the present instance that immediately the landing element is under supporting load the motor is shut off, with the result that it will then be necessary for the track 35 together with the driven wheel 61 to overrun and it is for that reason that the free-wheel is provided.

It is preferable that no special operation is required to effect driving of the caterpillar tread, and for that reason it is proposed that the drive should automatically be established when the landing element is extended, being cut off immediately the assembly is subjected to landing loads or immediately the landing element is retracted.

For controlling the supply of driving fluid to and from the motor 55, closure valves are provided in the pipelines, one of which is operable to establish flow on extension of the landing gear from a retracted position, while the other is to stop the flow of driving fluid immediately the landing element is subjected to supporting load. Each of the valves comprises a body 64 and is opened to allow flow by the application of pressure on a valve plunger 65, which on being pushed in opens the valve to permit flow through the pipeline. The valve shown in Figure 5a serves to establish flow as the landing element is extended from its retracted position. A projecting bolt 66, preferably adjustable in relation to a lug 67 which carries it, is arranged that as the leg 6 reaches its fully-extended condition, the valve plunger 65 is engaged by the end of the bolt 66 and is pressed in to establish flow to the motor 55. Having thus established on extension of the leg 6, the flow will continue to operate the motor 55 until such time as the flow is again interrupted. If the aircraft does not actually land, the flow will persist until the leg is retracted again, but for dealing with cut-off of the fluid flow when the aircraft is supported by its landing gear there is provided moving with the main pivot 12 a lever 68 which carries the bolt 66' for engaging the plunger 65 of a valve at the lower end of the leg. The arrangement is such that under a condition of no load when extended the bolt 66 pushes the valve plunger 65 in and maintains the flow established through the other valve and the pipelines 56 and 57. As soon as the landing gear is subjected to supporting load, however, movement of the long lever arm 13 about its pivot as has been previously described also effects such movement of the small lever 68 as will cause the bolt 66 to move away from the projection 65, thereby closing the valve. The valves preferably are spring-loaded to ensure that the plungers 65 are extended at all times except when they are positively pushed in by the bolt 66 or 66' as the case may be.

In Figure 5 the wheel 46 is shown broken away to reveal internal brake mechanism which conceivably in this case as also with the other examples illustrated may be applied to all wheels. Likewise drive from the motor 55 may be transmitted to the tread 35 through more than one wheel.

It will be appreciated that landing gear arrangements such as described above may provide a pair of main landing elements spaced laterally of an aircraft, in such cases provision may be made for differential braking of the tracks to assist manoeuvering of the aircraft on the ground. Likewise by suitably modifying the arrangement of Figure 5 to exclude the valve operated under ground load, the tracks may be driven differentially or otherwise under load to assist steering and maybe take-off of the aircraft.

It will be appreciated that modifications may be made without departing from the scope of the invention lying within the appended claims. Thus, the caterpillar unit consisting as it does of a somewhat boxlike structure or frame-work around which the tracks run, can house at least a part of the shock-absorbing means, the lever 13, 14 and any other parts which require protection. Particularly is that so in the case where each caterpillar unit is composed of laterally spaced treads, as are shown for instance with reference to Figures 4 and 4a. If required in such examples, the space between the tracks may be completely enclosed, the upper opening through which the shock-absorbing and supporting structure projects being covered by a suitably flexible member.

Although in the drawings the long lever arm 13 and the yieldable link afford by their manner of attachment a parallelogram ensuring that the attitude of caterpillar element is not altered during vertical movement, the relationship of those parts may be such as to achieve some deliberate movement of a caterpillar unit other than purely parallel movement.

In all cases, it is conceivable that the landing gear can be so arranged that the centre of gravity of the aircraft lies within the fore-and-aft limits of ground contact area of the track, thereby enabling the aircraft to be supported by the landing gear (duplicated in a lateral sense) without the necessity for providing a tail wheel or equivalent member.

A caterpillar unit having some or all of the fore-going features may be so mounted that it is permitted angular movement laterally, i. e. in the rolling sense, so that unevenness of ground or a landing with one wing down will not produce unduly concentrated load. Also, the whole tread area of the unit may be somewhat curved convexly either laterally or fore-and-aft or both, and the track, wheels or rollers upon which the tracks bear in running may be resilient either inherently or by resilient mounting. For example the tracks may have some degree of resilience being of a pneumatic or otherwise yieldable nature.

What I claim is:

1. In an aircraft landing gear, a supporting structure extending from the aircraft, a principal load bearing lever, pivot means on said structure mounting said lever for swinging in an up and down movement in trail of said structure, an endless track landing element including means pivotally mounting the same as a unitary structure to said lever upon a single pivotal axis remote from said lever pivot on said supporting structure for movement in a pitching sense, resiliently yieldable means interconnecting said landing element with said supporting structure and constructed and arranged whereby the leading portion of said landing element may move upwardly in the pitching sense under the influence of landing loads, and resilient means connected between the lever and the supporting structure to resist swinging of the lever under the influence of landing and taxiing loads transmitted through the landing element.

2. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure and constructed and arranged whereby the leading portion of said landing element may move upwardly in the pitching sense to vary the pitch attitude of said endless track landing element with respect to the supporting structure under landing and taxiing loads, and control means to change the attitude of the landing element in pitch.

3. In aircraft landing gear, an endless track landing element, a supporting structure extending from the aircraft, lever means pivotally connecting said caterpillar element to said supporting structure and defining a parallelogram lever system, whereby it is ensured that the attitude in pitch of the caterpillar element in space remains unaffected in shock absorbing movement, means in the form of a yieldable link comprising one side of the parallelogram lever system and providing thereat a side of variable length so as to permit movement of the caterpillar element in pitch, and means tending to restrain movement of the caterpillar element for shock absorbing purposes under load.

4. In aircraft landing gear, an endless track landing element, a supporting structure extending from the aircraft, lever means defining a parallelogram lever system pivotally connecting said caterpillar element to said supporting structure, a yieldable link defining one side of said parallelogram system providing for distortion thereof to accommodate movements of said caterpillar element in pitch, control means in said parallelogram lever system for effecting change of attitude of said caterpillar element in pitch, and means tending to restrain movement of said caterpillar element for shock absorbing purposes under load.

5. In aircraft landing gear, an endless track landing element, a supporting structure extending from the aircraft, lever means defining a parallelogram lever system pivotally connecting said caterpillar element to said supporting structure, yieldable means in one side of said parallelogram lever system tending to bias said caterpillar element to a tail down position in an unloaded condition, and means tending to restrain movement of said caterpillar element for shock absorbing purposes under load.

6. In aircraft landing gear, a supporting structure extending from the aircraft, lever means extending from a pivot on said structure for swinging up and down, an endless track landing element pivotally connected to the lever remote from the lever pivot on the structure for movement in a pitching sense, resilient means connected between the lever and the structure to resist swinging of the lever under the influence of landing and taxiing loads transmitted through the landing element, and a hollow portion at least at the lower end of said structure partially housing said resilient means.

7. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure and constructed and arranged whereby the leading portion of said landing element may move upwardly in the pitching sense to vary the pitch attitude of said endless track landing element with respect to the supporting structure under landing and taxiing loads, and power driving means carried by said landing unit drivably connected to the track means of said endless track landing element.

8. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure and constructed and arranged whereby the leading portion of said landing element may move upwardly in the pitching sense to vary the pitch attitude of said endless track landing element with respect to the supporting structure under landing and taxiing loads, power driving means and a free-wheeling clutch device carried by said endless track element, said power driving means being drivably connected to the track of the endless track element through said free-wheeling clutch to permit over-running of the track in relation to said power driving means.

9. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure and constructed and arranged whereby the leading portion of said landing element may move upwardly in the pitching sense to vary the pitch attitude of said endless track landing element with respect to the supporting structure under landing and taxiing loads, and a fluid motor carried upon said endless track landing element drivably connected to the track thereof.

10. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure to resist landing and taxiing loads, means interconnecting said landing element and said supporting structure and constructed and arranged whereby the leading portion of said landing element may move upwardly in the pitching sense to vary the pitch attitude of said endless track landing element with respect to the supporting structure under landing and taxiing loads, power driving means comprising a fluid pressure motor mounted on said endless track landing unit and drivingly connected to the track means of said unit for spinning the tread thereof preparatory to landing, pipe line means connecting said motor with a suitable source of power, and means in said pipe line for automatically interrupting fluid flow to said motor when said landing unit engages the ground.

11. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, means interconnecting said landing element and said supporting structure and constructed and arranged whereby the leading portion of said landing element may move upwardly in the pitching sense to vary the pitch attitude of the endless track landing element with respect to the supporting structure under landing and taxiing loads, power driving means comprising a fluid pressure motor mounted on said endless track landing unit and drivingly connected to the track means of said unit, pipe line means connecting said power driving means to a source of power, and means in said pipe line automatically actuated by extension of said landing element to thereby establish fluid flow through said pipe line means to said motor.

12. Landing gear for aircraft comprising a leg structure, a lever pivoted on said leg, an endless track landing unit supported pivotally on said lever which is in trail of said leg, said lever and said track unit being pivoted to said structure about a single transverse pivot which transmits all of the landing and taxiing loads through said transverse pivot, resilient means connected between said lever and said structure to resist swinging movement of the lever about the pivot, and means connected between said lever and said structure to vary the pitch attitude of said track.

13. In an aircraft landing gear, a supporting structure extending from the aircraft, a lever pivoted to the lower end thereof, an endless track landing element pivoted to said lever at a point intermediate the ends of that portion of the track which engages with the ground, said leg being located forwardly and above said pivotal point in advance of the area of engagement of the track with the ground, and means of regulating the angular position of said caterpillar element with respect to said lever.

14. In an aircraft landing gear, a supporting structure depending from the aircraft, a lever, pivot means carried upon said structure mounting said lever thereon in trail of said structure, an endless track landing element constructed and arranged as a unitary structure, means pivotally mounting said unitary structure upon said lever upon a single axis transverse to the lever and remote from the pivotal connection of said lever on said supporting structure, means connecting said landing unit to said supporting structure constructed and arranged whereby the leading portion of said landing element may move upwardly against resilient resistance in the pitching sense under the influence of landing loads and for changing the initial pitch attitude of said endless track landing element upon its pivot on said lever, and shock absorbing means connected between said lever and said supporting structure to resist swinging of said lever under the influence of landing and taxiing loads, said shock absorbing means being positioned with respect to said lever and said structure to permit relatively large movements of the landing element under load in comparison with relatively small deflections of said shock absorber means.

15. In an aircraft landing gear, a supporting structure extending from the aircraft, a principal load bearing lever, pivot means on said structure mounting said lever for swinging in an up and down movement in trail of said structure, an endless track landing element including means pivotally mounting the same as a unitary structure to said lever upon a single pivotal axis remote from said lever pivot on said supporting structure and disposed rearwardly over the area-center of ground contact pressure for movement in a pitching sense, resiliently yieldable means interconnecting said landing element with said supporting structure and constructed and arranged whereby the leading portion of said landing element may move upwardly in the pitching sense under the influence of landing loads, and resilient means connected between the lever and the supporting structure to resist swinging of the lever under the influence of landing and taxiing loads transmitted through the landing element.

16. An aircraft landing gear comprising, a leg structure, means for mounting said leg structure to the aircraft, a main load carrying lever, pivot means on said leg structure mounting said lever for swinging movement up and down, an endless track landing element having a mounting spindle disposed thereon rearwardly of the area-center of ground contact pressure and pivotally connecting said landing element to said lever, means providing limited freedom of movement of said landing element in a pitching sense, resilient means connected between said lever and said leg to resist swinging of said lever under the influence of landing and taxiing loads transmitted through the landing element and control means to change the attitude of the landing element in the pitching sense.

17. An aircraft landing gear comprising, a leg structure, means for mounting said leg structure to the aircraft, a main load carrying lever, pivot means on said leg structure mounting said lever for swinging movement up and down, an endless track landing element having a mounting spindle disposed thereon rearwardly of the area-center of ground contact pressure and pivotally connecting said landing element to said lever, means providing limited freedom of movement of said landing element in a pitching sense, resilient means connected between said lever and said leg to resist swinging of said lever under the influence of landing and taxiing loads transmitted through the landing element, control means to change the attitude of the landing element in the pitching sense, said control means comprising a trimming strut connected to said landing element and said leg and having resilient means therein to oppose opposite axial movement of opposite ends of said strut, said strut positioning said landing element in an attitude of pitch correct for satisfactory landing when the landing element is in an unloaded condition.

18. An aircraft landing gear comprising, a leg structure, means for mounting said leg structure to the aircraft, a main load carrying lever, pivot means on said leg structure mounting said lever for swinging movement up and down, an endless track landing element having a mounting spindle disposed thereon rearwardly of the area-center of ground contact pressure and pivotally connecting said landing element to said lever, means providing limited freedom of movement of said landing element in a pitching sense, resilient means connected between said lever and said leg to resist swinging of said lever under the influence of landing and taxiing loads transmitted through the landing element, and control means comprising a fluid actuated jack interconnecting said lever and said leg said jack being selectively operable to vary the attitude of the landing element in the pitching sense.

19. An aircraft landing gear comprising, a leg structure, means for mounting said leg structure to the aircraft, a main load carrying lever, pivot means on said leg structure mounting said lever for swinging movement up and down, an endless track landing element having a mounting spindle disposed thereon rearwardly of the area-center of ground contact pressure and pivotally connecting said landing element to said lever, resilient means connected between said lever and said leg to resist swinging of the lever under the influence of landing and taxiing loads transmitted through the landing element, and a trimming strut interconnecting said landing element and said lever to position said landing element in an attitude for landing while said landing element remains unloaded preparatory to landing and including resilient means therein, said resilient means in said trimming strut being constructed and arranged whereby said landing element may change its pitch attitude under landing and taxiing load.

20. An aircraft landing gear comprising, a leg structure, means for mounting said leg structure to the aircraft, a main load carrying lever, pivot means on said leg structure mounting said lever for swinging movement up and down, an endless track landing element having a mounting spindle disposed thereon rearwardly of the area-center of ground contact pressure and pivotally connecting said landing element to said lever, means providing limited freedom of movement of said landing element in a pitching sense, resilient means connected between said lever and said leg to resist swinging of said lever under the influence of landing and taxiing loads transmitted through the landing element, and control means comprising a fluid actuated jack interconnecting said lever and said leg, said jack being positioned in substantial parallel relation to said lever, said jack being selectively operable to vary the attitude of the landing element in the pitching sense.

21. In aircraft landing gear, a supporting structure depending from the aircraft, a lever, means pivotally mounting said lever upon said structure in trail thereof, an endless track landing element including means pivotally mounting the same as a unitary structure upon said lever upon a single transverse pivotal axis remote from the pivot of said lever on said supporting structure, shock absorber means connected between said lever and said supporting structure to resist landing and taxiing loads, and means interconnecting said landing element and said supporting structure and constructed and arranged whereby the leading portion of said landing element may move upwardly in the pitching sense and whereby the pitch attitude of said endless track landing element may vary with respect to the supporting structure under landing and taxiing loads.

22. In aircraft landing gear, a supporting structure depending from the aircraft, a lever, means pivotally mounting said lever upon said supporting structure for swinging up and down in trail thereof, an endless track landing unit including means pivotally mounting the same upon said lever as a unitary structure upon an axis transverse to the lever and remote from said lever pivot on said supporting structure, yieldable means connecting said landing unit to said supporting structure and constructed and arranged whereby the leading portion of said landing unit may move upwardly in the pitching sense during swinging of said lever under landing and taxiing loads transmitted through the landing element, shock absorber means interconnecting said lever and said supporting structure to resiliently resist swinging of said lever, and means to regulate the attitude in pitch of said landing element to initially position the supporting area of said unit with respect to the landing surface.

23. In aircraft landing gear, a supporting structure depending from the aircraft, a lever, means pivotally mounting said lever upon said structure and in trail of said structure, an endless track landing unit including means pivotally mounting the same as a unitary structure upon said lever upon a single axis transverse to the lever and remote from the pivotal connection of said lever on said supporting structure, shock-absorber means interconnecting said lever and said supporting structure to resist landing and taxiing loads, means connecting said landing unit to said supporting structure and constructed and arranged whereby the leading portion of said landing unit may move upwardly in a pitching sense for yielding movement of said unit about said pivot, and means associated with said last mentioned means for changing the pitch attitude of said endless track landing unit.

GEORGE HERBERT DOWTY.